(No Model.)
C. E. GAREY.
STREET CAR LAMP.
No. 365,062. Patented June 21, 1887.
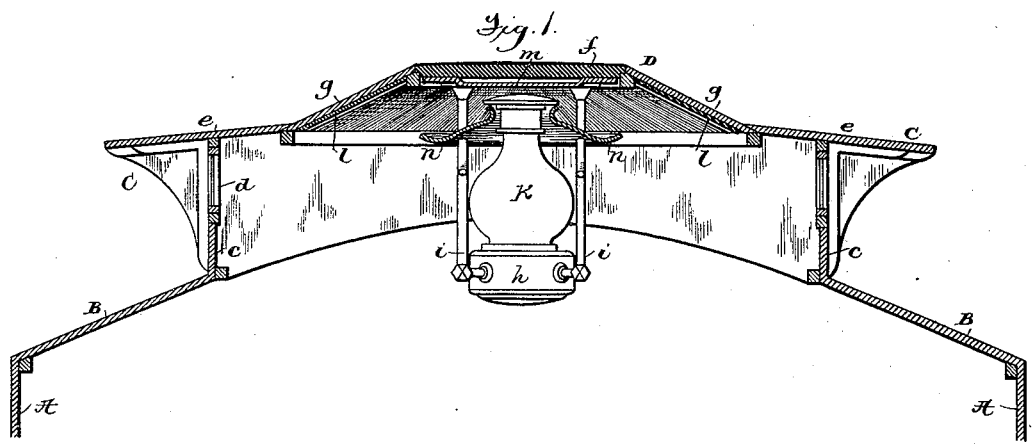
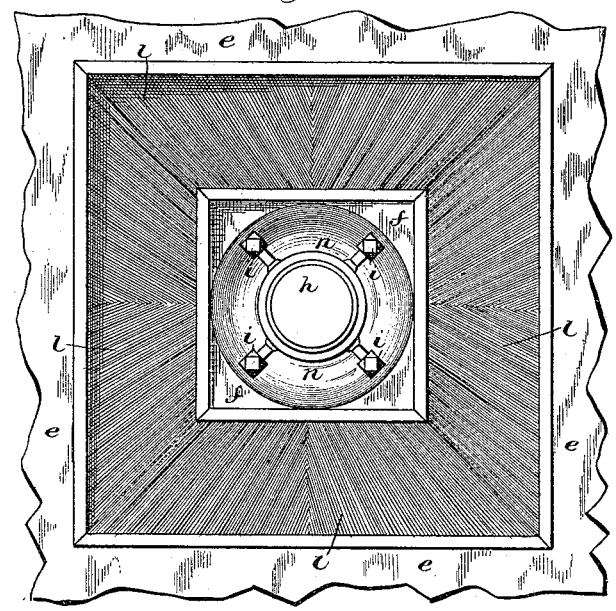
Attest:
Geo. H. Potts.
J. A. Hovey.
Inventor:
Caleb E. Garey
by Munson & Philipp
Attys.

UNITED STATES PATENT OFFICE.

CALEB E. GAREY, OF NEW YORK, N. Y., ASSIGNOR TO THE DRY DOCK, EAST BROADWAY AND BATTERY RAILWAY COMPANY, OF NEW YORK.

STREET-CAR LAMP.

SPECIFICATION forming part of Letters Patent No. 365,062, dated June 21, 1887.

Application filed January 14, 1887. Serial No. 224,317. (No model.)

*To all whom it may concern:*

Be it known that I, CALEB E. GAREY, a citizen of the United States, residing at New York, county of New York, and State of New York, have invented certain new and useful Improvements in Street-Cars, fully described and represented in the following specification and the accompanying drawings, forming a part of the same.

This invention relates to the construction of ordinary street-railway cars, and particularly to certain features in the construction of such cars, the purpose of which is to secure better lighting for the cars.

The lighting of street-cars was formerly almost always effected by means of one or more lamps or candles placed at the end or ends of the car; but of late, and particularly in the better classes of cars, it has been found most desirable to provide, in addition to the end lights, one or more lamps, which is or are located overhead and beneath the raised central portion of the roof.

In the constructions heretofore in use the lamp or lamps located overhead have been so constructed and arranged that it was necessary to provide the roof of the car above the lamp with an opening, in order to secure proper draft for the lamp, and the results attained by these constructions have not been entirely satisfactory, owing to the fact that the stopping and starting and the otherwise unsteady motion of the car created an irregular draft through the lamp-chimney and the opening above it, which caused the lamp to flicker and smoke. A further difficulty was found to exist in the fact that with the constructions heretofore in use it was impossible to secure an even diffusion of the light throughout all portions of the car, some parts being very much better lighted than others.

It is the object of the present invention to overcome these objectionable features and to provide a construction which will secure a steady unflickering light which will be evenly diffused throughout the car.

As a full understanding of the invention can be best given by an illustration and description of the parts of a car embodying the same, all preliminary description of the invention will be omitted and a full description given, reference being had to the accompanying drawings, in which—

Figure 1 is a cross-section of the upper or roof portion of a street-car constructed according to the present invention. Fig. 2 is a plan view of the central portion of Fig. 1, looking upward, and Fig. 3 is a sectional view similar to Fig. 1, but taken at right angles thereto, or lengthwise of the car.

Referring to said figures, it is to be understood that A represents the sides, and B the roof, of an ordinary street-car. The roof B is provided over the center of the car with the usual raised portion, C, the sides $c$ of which are provided with the usual small ventilating-windows, $d$. The top $e$ of this raised portion C is provided about midway of the length of the car with a low dome or closed elevation, D, having a flat or substantially flat closed or solid top, $f$, and inclined sides $g$, which slope outward to the portion $e$.

The lamp $h$ is so constructed as to burn freely without ventilation through the roof, and is suspended beneath the center of the dome D and close to the roof $f$ by means of rods $i$, which depend from the top of the dome. The dome D is of the square or rectangular form shown, as this form will secure the best results. The sides $g$ of the dome are lined or covered upon the inside with reflectors $l$, which consist of sheets of polished metal. The top $f$ of the dome will preferably also be provided upon its under side with a plate, $m$, which will act to reflect the light downward.

In addition to the parts already described, the rods $i$ may also support a reflector, $n$, of the ordinary form shown.

By means of the construction which has been described the lamp $h$ is raised sufficiently to be out of the way of the heads of passengers walking or standing in the central aisle of the car without being so surrounded by the parts of the roof of the car as to prevent its light from radiating horizontally in all directions, and at the same time the large extent and slight inclination of the reflectors $l$, which is made possible by the shape and arrangement of the dome D, causes the light, instead of being reflected directly or nearly directly downward, to be diffused throughout the whole or nearly whole extent of the car, thus giving uniform or substantially uniform light to all parts of the car, and at the same time, the roof of the dome D being solid, the stopping and starting and other irregular movements of the car cannot produce irregular drafts through the lamp-chimney, so as to cause the flame to flicker and smoke.

I am aware of the construction described in United States Letters Patent No. 161,566, and I do not claim the construction therein shown and described; but,

Having thus described my invention, what I do claim as new, and desire to secure by Letters Patent, is—

In a street-car, the combination, with the roof B, having the raised portion C, of the square or rectangular closed elevation D, rising above the top of the portion C, and having a closed flat, or substantially flat, top, $f$, and inclined sides $g$, provided with reflectors $l$, and the lamp $h$, suspended beneath and from the top of the dome, whereby the lamp will not be subjected to unsteady draft and will have its light evenly diffused throughout the car, substantially as described.

In testimony whereof I have hereunto set my hand in the presence of two subscribing witnesses.

CALEB E. GAREY.

Witnesses:
J. A. HOVEY,
JAMES J. KENNEDY.